Patented June 4, 1935

2,003,861

UNITED STATES PATENT OFFICE 2,003,861

PAVING MATERIAL AND PROCESS OF PREPARING IT

Kenneth E. McConnaughay, Indianapolis, Ind., assignor to Pre Cote Corporation, Indianapolis, Ind., a corporation of Indiana No Drawing. Application January 5, 1933, Serial No. 650,266

7 Claims. (Cl. 106—31)

This invention relates to paving compositions composed of a mixture of aggregate and a bituminous binder. The principal object of my invention is to improve the character of pavements produced with such compositions.

I find that imperfections in pavements frequently result from an imperfect bond between the binder and the aggregate and that this imperfect bond in most cases results from either or both of two causes. That is, imperfect bonding of the binder to the aggregate may be due to a film of dust between the surface of each aggregate particle or the capillary passages in the bedded or to the fact that the binder and aggregate are of such a nature that the binder does not wet the aggregate surface.

Fundamentally, of course, both these causes of poor bonding are, in turn, the result of surface-tension phenomena. That is, if the surface-tension of the binder toward air is too high, the binder will not penetrate the pores of the aggregate particles or the capillary passages in the dust film on the aggregate particle; and if the surface-tension of the binder toward the aggregate is too high, the binder will not flow or spread evenly over the surface thereof. Another factor affecting the coating of aggregate, especially when the aggregate is damp or when the binder is applied in emulsified form, is the affinity of the aggregate for water. Unless the aggregate has a greater affinity for the binder than it does for water, an unsatisfactory coating will result.

In employing my process to produce a paving composition of aggregate and a binder, I first treat the aggregate to increase its affinity for bitumen, to decrease its affinity for water, and to replace air in the pores and capillary passages with a substance miscible with the binder which is to be later applied. The preferred material for this preliminary treatment of the aggregate comprises three constituents—first, a low-priced, non-volatile oil of low to medium viscosity; second, a coal-tar distillate; and third, a sulphonated fatty oil, grease, or fatty pitch primarily functioning as an emulsifying agent.

The oil first mentioned is adapted to provide an oil base for the aggregate-treating material, which base, by reason of its non-volatile character, will remain in and on the surface of the aggregate so that when a bituminous binder is subsequently applied the binder will penetrate the pores of the aggregate particles and obtain an effective bond therewith. When, therefore, the aggregate is to be used with a bituminous binder, the oil base should be a relatively good flux for the binder subsequently to be applied. A further function of the non-volatile oil is to prevent, or at least materially retard, the loss by volatilization of the tar-distillate. Suitable oils are crude petroleum oils, crude tar oils, or low-priced vegetable oils.

The second named constituent of the treating material, namely the coal-tar distillate, I have found to possess the function of wetting the surface of the aggregate particles more effectively than asphaltic bitumens do; and this wetting characteristic furthers the dispersion of the subsequently applied binder over the surface of the aggregate particles and into the pores and capillary passages thereof. The purpose of such a tar distillate in the treating composition is to adapt the composition to the treatment of a wide variety of aggregates including those to which asphalts do not readily adhere. If the character of the aggregate upon which the treating material is to be used is known in advance it may be desirable to select between various tar-distillates. For example, for siliceous aggregates, I have found the efficacy of the treating material to be increased if the tar-distillate consists principally of tar acids; while for cherty gravels or those containing iron-oxide bearing clays in combination, tar bases will be found more satisfactory.

Tar distillates which I find suitable include benzene, toluene, solvent naphtha, pyridine, tar bases, tar acids, phenol, xylenol, cresol, or mixtures of various such substances such as anthracene oil or the so-called light oil, middle oil, or heavy oil. The lighter materials are relatively less desirable because of volatility and cost. Obviously, since my treating composition is used in liquid form, those tar-distillates are most desirable which are liquid at ordinary temperatures; but heavier distillates can be used if they are of such a nature as to dissolve in the non-volatile oil included in the composition.

The third ingredient of the composition, as indicated, performs the function of an emulsifying agent, adapts the treating composition for the treatment of wet aggregate, and further facilitates the bonding of subsequently applied bitumen if such subsequently applied bitumen is in emulsified form.

As a specific example of a composition suitable for the preliminary treating of aggregate, the following may be mentioned:

100 to 150 parts of a low priced relatively low viscosity non-volatile oil such as fuel oil, road oil, Diesel oil, or crude oil; 40 to 100 parts of a coal tar distillate; and 1 to 20 parts of a sulphonated fatty oil, grease, or fatty pitch, capable of rendering the oil and coal-tar distillate emulsifiable in water.

The above composition, after mixing, is applied to the aggregate in relatively small portions—say one-half to three-fourths of a gallon of treating material to one ton of aggregate. This small quantity of liquid material is insufficient to form a coating of any appreciable thickness on the aggregate particles.

Because of the relatively small proportion of treating material used its application to and even distribution in the aggregate is facilitated if the treating material is thinned. This thinning can of course be accomplished by the use of a volatile solvent, but a more economical method is that of emulsification. The degree of thinning will depend to a large extent upon the method employed in applying the treating material to the aggregate. If the treating material is applied in the form of a fine mist, the treating material may be agitated with water in the proportions of one part treating material to one part water and the resulting emulsion applied to the aggregate. If the treating material is sprayed on the material in solid streams, or if the aggregate is treated by immersing it in the thinned treating material, it will be obvious that a greater degree of thinning will be required.

Following the above treatment, the emulsion will break and the water run off leaving behind on and in the aggregate the ingredients of the treating composition. Except in the case of extremely absorptive aggregate, it is highly desirable to "cure" the treated aggregate for a period of about ten hours or more before mixing it with a binder to form a paving composition. This curing period permits the water of the treating emulsion to drain off and the oil to be absorbed.

The treating emulsion is obviously one of low viscosity, and thus spreads readily over the surface of the aggregate and finds its way into the pores and capillary passages of the aggregate particles. The presence in the treating material of the emulsifying agent furthers the impregnation of the aggregate with the treating material as the result of the reduced surface-tension it effects.

Material treated as above may be dried and stored indefinitely. If the aggregate is a comparatively friable aggregate, such as limestone, the treatment which has been given it will prevent in large measure abrasion and attrition, and thus avoid loss of aggregate particles of effective size and the objectionable collection of mat-forming dust at the bottom of storage piles in the open.

Aggregate treated as above outlined produces a more satisfactory pavement, when mixed with a bituminous binder, than does untreated aggregate. In the treated aggregate, the pores and capillary passages adjacent the surface of the aggregate particles, instead of being filled with air which tends to prevent the entrance of the relatively viscous binder, are filled largely with oil or a mixture of oil and tar-distillates which serves as a flux for the bitumen and leads it into such pores and passages, thus producing a better bond between the binder and the aggregate particles. Further, I believe the sulphonated emulsifying agents which I prefer to use have an additional advantage in promoting a better bonding between the aggregate and the binder owing to their somewhat corrosive action on the aggregate particles.

While it is possible to use in my aggregate-treating material emulsifying agents other than sulphonated fatty oils, greases, or fatty pitches, I prefer to use these ingredients. Most of the cheaper soaps are relatively unsuitable in that they either are insoluble in the oil or tend to form an emulsion of the water-in-oil type. Soaps made from such organic bases as diethanolamine and triethanolamine, which otherwise would be satisfactory for my purpose, are relatively so expensive as to make their use impracticable.

As previously pointed out, one function of the non-volatile oil in my treating composition is to prevent or decrease the loss of the other ingredients by volatilization. If the aggregate is to be used fairly promptly following its preliminary treatment, the possible loss of ingredients by volatilization is not serious, and the non-volatile oil may therefore be dispensed with. If this is done, the emulsifying agent embodied in the treating material may be made by sulphonating a portion of the coal-tar distillate.

Coal-tar distillates, being more readily emulsifiable in water than are the non-volatile oils such as I may use in my aggregate-treating material, may be satisfactorily emulsified with the use of a sulphonated aromatic compound such as coal-tar distillates contain; but if the treating material is to include a non-volatile oil, which is less readily emulsifiable, it will usually be found necessary to employ a more effective emulsifying agent such as the sulphonated fatty oils, greases, or fatty pitches, previously mentioned.

I have referred above to the advantages which follow the corrosive action of sulphonated emulsifying agents on the aggregate. It may frequently be found desirable to increase this corrosive action by employing in the treating composition somewhat more sulphuric acid than that necessary to sulphonate the fatty acid or other emulsifying agent. For example, I may use two to ten times as much sulphuric acid as is necessary to sulphonate the fatty acid, fatty pitch, or aromatic compounds; and this excess of sulphuric acid will, due to its corrosive action, noticeably increase the bond between the aggregate and a subsequently applied bitumen. In fact, sulphuric acid, even when used alone, has the property of increasing the affinity of many aggregates for bitumen. Thus, dilute sulphuric acid (2%–25%) may be applied to aggregate in the proportions of one-half gallon to two gallons per ton of aggregate, and a decided improvement in the character of the bond between the aggregate and bitumen obtained.

My invention is not especially concerned with the precise method in which the treated aggregate is mixed with a binder to form a paving composition. The treated material may be mixed, as in a pug-mill mixer, with bitumen liquefied by emulsification, by a solvent, or by heat; or the binder, liquefied in any desired manner, may be applied to the aggregate by immersing the aggregate in it. I prefer the method of coating which comprises immersing the treated aggregate in a bituminous emulsion, removing it from the bitumen bath, and permitting excess binder to drain from the aggregate; but, while this method of applying the binder is especially suitable and therefore to be preferred, my invention is not limited to it. When the binder is applied by the preferred method, the effect of the preliminary treatment seems to be that it insures the breaking of the bituminous emulsion film from within outwardly, in other words, that it causes the emulsion immediately adjacent the surface of each aggregate particle to break and the bitumen thereof to become bonded to the aggregate while the outer portions of the film on the particle are still in emulsified condition. Thus, the bitumen film on each aggregate particle builds up from the surface of the particle outwardly and the water separating from the bitumen will have a free path of escape.

It may be desirable, especially if the aggregate is very wet, to dry the aggregate before the treating composition is applied to it. This may be done in any convenient manner, as by agitating the aggregate on a heated surface, or by blowing air, preferably heated, over or through it. Further, the duration of the "curing" period following application of the treating composition may be shortened if desired by heating to drive off water.

I claim as my invention:

1. The process of producing a paving composition consisting of a mixture of aggregate and a bituminous binder, which comprises impregnating the surface of the aggregate particles with a liquid mixture of an oil miscible with said binder, a tar distillate, an emulsifying agent, and an inert thinner, and subsequently mixing the aggregate so treated with a bituminous binder, the amount of said liquid mixture applied to the aggregate being insufficient in quantity to leave on the surface of the aggregate any excess of said oil, said tar distillate, or said emulsifying agent.

2. The process of producing a paving composition consisting of a mixture of aggregate and a bituminous binder, which comprises impregnating the surface of the aggregate particles with a liquid mixture of an oil miscible with said binder, a tar distillate, a sulphonated emulsifying agent, and an inert thinner, and subsequently mixing the aggregate so treated with a bituminous binder, the amount of said liquid mixture applied to the aggregate being insufficient in quantity to leave on the surface of the aggregate any excess of said oil, said tar distillate, or said emulsifying agent.

3. The process of producing a paving composition consisting of a mixture of aggregate and a bituminous binder, which comprises impregnating the surface of the aggregate particles with a liquid mixture of an oil miscible with said binder, a tar distillate, and an emulsifying agent, and subsequently mixing the aggregate so treated with a bituminous binder, the amount of said liquid mixture applied to the aggregate being insufficient in quantity to leave on the surface of the aggregate any excess of said oil, said tar distillate, or said emulsifying agent.

4. The process of producing a paving composition consisting of a mixture of aggregate and a bituminous binder, which comprises impregnating the surface of the aggregate particles with a liquid mixture of an oil miscible with said binder, a tar distillate, and a sulphonated emulsifying agent, and subsequently mixing the aggregate so treated with a bituminous binder, the amount of said liquid mixture applied to the aggregate being insufficient in quantity to leave on the surface of the aggregate any excess of said oil, said tar distillate, or said emulsifying agent.

5. An article of the class described, comprising an aggregate particle the surface of which has been impregnated with a mixture of a non-volatile oil, an emulsifying agent, and a tar distillate, the surface of the aggregate particle being free from any excess oil, emulsifying agent, or tar distillate.

6. An article of the class described, comprising an aggregate particle the surface of which has been impregnated with a mixture of a non-volatile oil, a sulphonated emulsifying agent, and a tar distillate, the surface of the aggregate particle being free from any excess oil, emulsifying agent, or tar distillate.

7. The process of treating aggregate to adapt it for application of a bituminous binder, which comprises applying to the aggregate a mixture of a tar distillate and sulphuric acid, the acid being present in quantity greater than that necessary to sulphonate the tar distillate.

KENNETH E. McCONNAUGHAY.

CERTIFICATE OF CORRECTION.

Patent No. 2,003,861.

June 4, 1935.

KENNETH E. McCONNAUGHAY.

It is hereby certified that error appears in the printed specification of the above numbered patent requiring correction as follows: Page 1, first column, line 13, for the words "or the capillary passages in the" read and the binder in which it is em-; and that the said Letters Patent should be read with this correction therein that the same may conform to the record of the case in the Patent Office.

Signed and sealed this 2nd day of July, A. D. 1935.

(Seal)

Leslie Frazer

Acting Commissioner of Patents.